United States Patent [19]

Cederwall et al.

[11] Patent Number: 4,668,162
[45] Date of Patent: May 26, 1987

[54] CHANGEABLE COOLING CONTROL SYSTEM FOR A TURBINE SHROUD AND ROTOR

[75] Inventors: Philip J. Cederwall, San Diego; David M. Evans, Chula Vista; Boris Glezer; John J. Hensley, both of San Diego, all of Calif.

[73] Assignee: Solar Turbines Incorporated, San Diego, Calif.

[21] Appl. No.: 776,322

[22] Filed: Sep. 16, 1985

[51] Int. Cl.$^4$ ............................................. F01D 25/08
[52] U.S. Cl. ................................... 415/115; 415/116; 415/DIG. 3
[58] Field of Search ......... 415/115, 116, 126, DIG. 3, 415/146, 175, 117

[56] References Cited

U.S. PATENT DOCUMENTS

| | | | |
|---|---|---|---|
| 2,639,579 | 5/1953 | Willgoos | 415/115 |
| 2,640,319 | 6/1953 | Wislicenus | 415/115 |
| 3,199,294 | 8/1965 | Hagen | 415/115 |
| 3,211,423 | 10/1965 | Gilbert | 415/DIG. 1 |
| 3,295,823 | 1/1967 | Waugh et al. | 415/115 |
| 3,452,542 | 7/1969 | Saferstein et al. | 415/115 |
| 4,173,120 | 11/1979 | Grosjean et al. | 415/115 |
| 4,416,111 | 11/1983 | Lenahan et al. | 415/115 |
| 4,428,713 | 1/1984 | Coplin et al. | 415/116 |
| 4,478,551 | 10/1984 | Honeycutt, Jr. et al. | 415/142 |

FOREIGN PATENT DOCUMENTS 737245  9/1955 United Kingdom ................ 415/116

*Primary Examiner*—Robert E. Garrett
*Assistant Examiner*—John Kwon
*Attorney, Agent, or Firm*—Larry G. Cain

[57] ABSTRACT

Cooling air delivery systems for gas turbine engines are used to increase component life and increase efficiencies. To change the flow rate of cooling air in past engines, major disassembly of engine components was required resulting in the loss of the engine's service and excessive costs. With the changeable cooling air delivery system of the present invention, major engine disassembly is eliminated. An elongate member extends into a fluid control passage to establish a preselected flow area which can be changed. The time and expense required to change the cooling flow rate is drastically reduced because the elongate members are accessible external of the engine. The elongate member is removed from the engine and replaced by different elongate member having a different outer diameter of the stem or sleeve. The different diameter results in a new clearance or preselected flow area for cooling air to pass therethrough.

10 Claims, 2 Drawing Figures

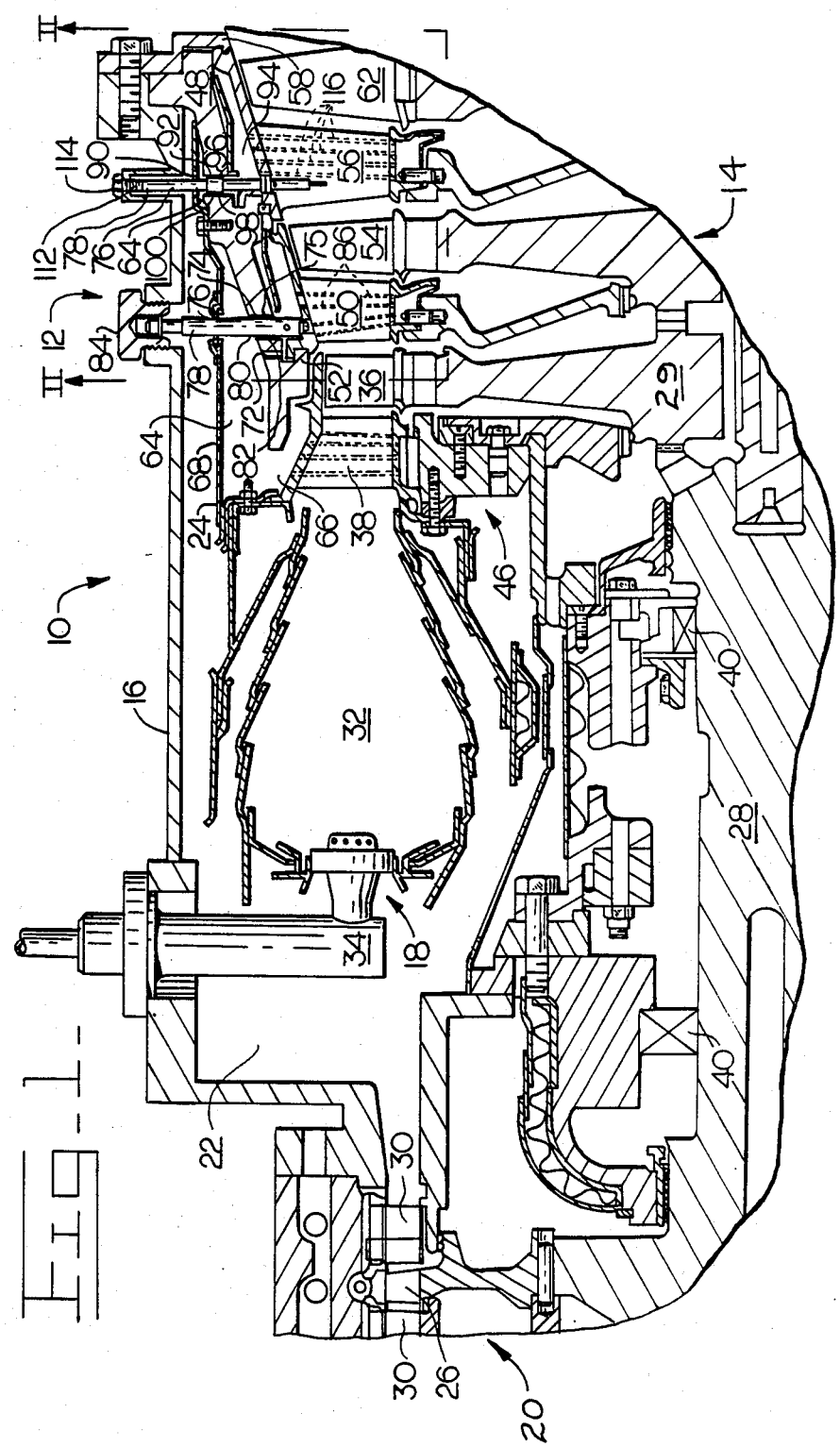

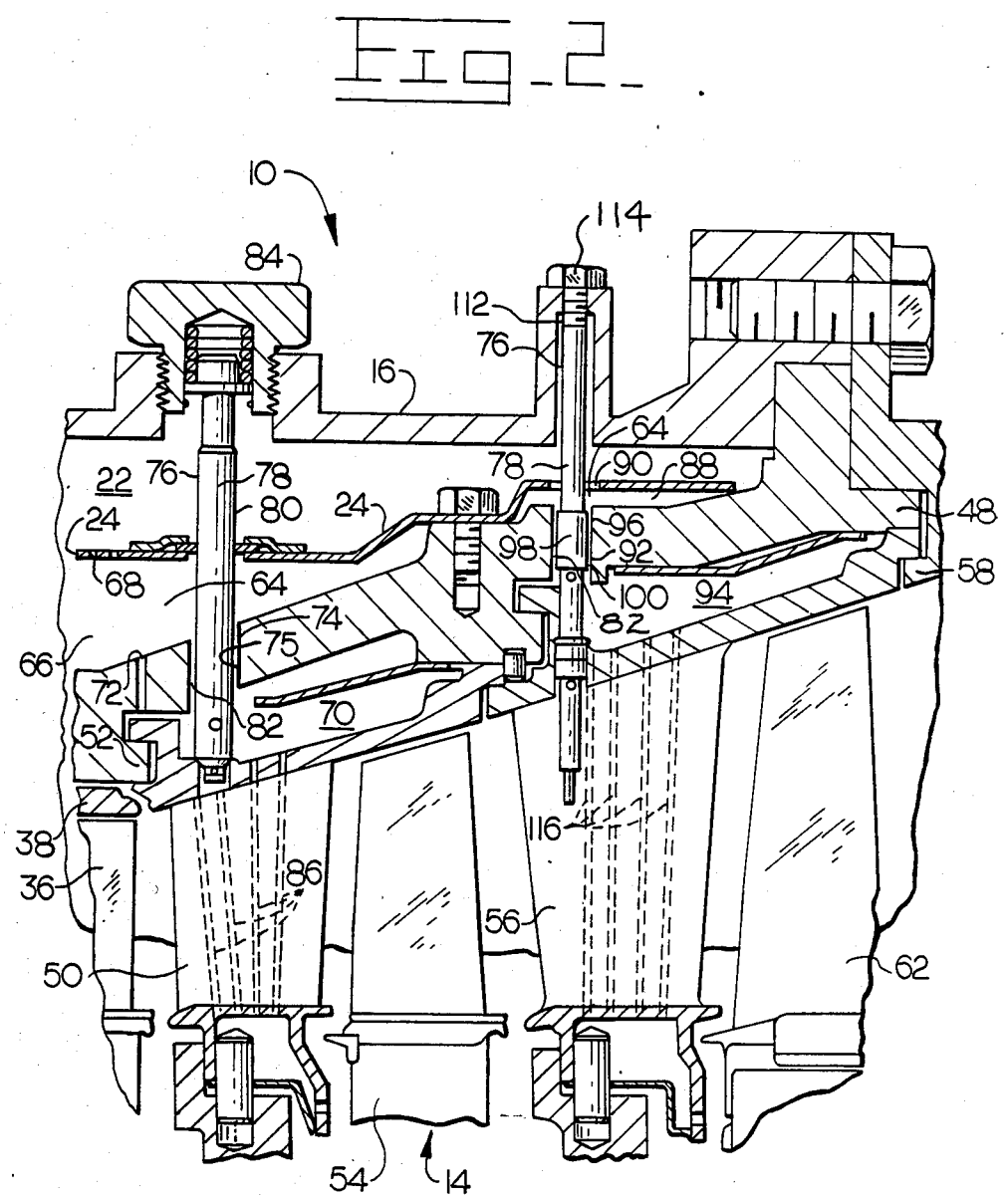
Fig_2_

CHANGEABLE COOLING CONTROL SYSTEM FOR A TURBINE SHROUD AND ROTOR

DESCRIPTION

1. Technical Field

This invention relates generally to gas turbine engine cooling and more particularly to the controlling of the flow rate of cooling air to the nozzle and rotor wherein the controlling device is accessible external of the gas turbine engine and allows the flow rate to be changeable.

2. Background

High performance gas turbine engines require cooling passages and cooling flows to ensure reliability and cycle life of individual components within the engine. For example, to improve fuel economy characteristics engines are being operated at higher temperatures than the material physical property limits of which the engines are constructed. These higher temperatures, if not compensated for, erode engine components and decrease component life. Cooling passages are used to direct a flow of air to such engine components to reduce the high temperature of the components and prolong component life by limiting the temperature to a level which is consistent with material properties of such components.

Historically, a portion of the compressed air is bled from the engine compressor section to cool these components. The amount of air bled from the compressor section is usually controlled to insure that there is sufficient air remaining for engine combustion.

As engines operate and wear, leakage increases, output power decreases and efficiencies decrease. As the efficiencies decrease and optimum performance due to component deterioration is desired, more cooling of critical components is required.

Various arrangements for controlling cooling flow are available. U.S. Pat. No. 4,213,738 issued to James R. Williams on July 22, 1980 discloses a cooling flow valve for regulating cooling air flow to a turbine rotor in accordance with compressor discharge pressure and operating temperature of the turbine component. A movable valve element is formed as a part of a pressurizable diaphragm operated actuator. Operating temperature of a blade component is sensed and a regulator device controls the pressure on one side of the diaphragm in response to the temperature to allow the diaphragm to move the valve element to modulate cooling air flow to the turbine rotor and blade components.

U.S. Pat. No. 4,296,599 issued to Arthur P. Adamson on Oct. 27, 1981 discloses a plurality of valves placed in mutually parallel relationship to collectively provide for the modulation of the cooling air flow. Each of the valves has a flap hingedly mounted at one edge to a pivot in such a way as to allow the flap to move to the closed position to block or restrict air flow through an opening. In the open position of the flap, cooling air flows through the opening which is sized by the maximum required cooling air flow. The opening and closing of the valve flap is controlled by an automatic mechanism which operates each of the valve flaps individually in response to predetermined operating parameters.

The Williams patent employs a complex sensing device for controlling the pressure on one side of the diaphragm. An electromagnetically operated control valve is connected to the bleed tube. An infra-red pyrometer, in the line-of-sight with the ring of turbine blades, is responsive to temperature changes and produces a signal to the control valve to selectively regulate the pressure bled from the one side of the diaphragm. The resultant pressure differential controls the gap between the valve element and its seat. The complexity of sensors, control units and valves are costly to install and maintain. The reliability of a plurality of mechanisms is reduced drastically as the number of components increase and the reliability of electrical circuits is reduced as the number of connections are increased. The combination of a plurality of components and connections jeopardizes the operation, efficiency and reliability of the engine.

The Adamson patent also employs a complex arrangement of valves, automatic opening and closing mechanisms and a sensor for each valve. The problems associated with reliability of installation and maintenance as indicated above in the Williams arrangement also plagues the Adamson arrangement. Both arrangements must provide a sealing device that will function within a hot atmosphere. Such an atmosphere is not conducive to sealing components and in most cases reduces the life of such components due to hardening and cracking of the sealing surfaces. The devices for controlling the flow of cooling air as suggested by Adamson and Williams are positioned within the engine and would require extensive disassembly to repair or replace such devices when a failure occurs.

The present invention is directed to overcoming one or more of the problems as set forth above.

DISCLOSURE OF THE INVENTION

In one aspect of the present invention, a cooling air delivery system for cooling components of a gas turbine engine having a compressor section and a compressor discharge plenum fluidly connecting the air delivery system to the compressor section comprises a fluid flow path and an elongate member. The fluid flow path interconnects the compressor discharge plenum with the engine components to be cooled and includes a fluid flow control passage. The elongate member extends into the passage and has a diameter selected to establish a flow rate of cooling air through the passage in accordance with predetermined operating parameters of the engine. The member has a portion thereof which is accessible external of the engine.

In another aspect of the invention a gas turbine engine includes a cooling air delivery system for cooling a nozzle vane, a turbine rotor, a compressor section and a compressor discharge plenum fluidly connecting the air delivery system to the compressor section. The engine comprises a fluid flow path and an elongate member. The fluid flow path interconnects the compressor discharge plenum with the engine components to be cooled and includes a fluid flow control passage. The elongate member extends into the passage and has a diameter selected to establish a flow rate of cooling air through the passage in accordance with predetermined operating parameters of the engine. The member has a portion thereof accessible external of the engine.

In one embodiment of the invention, a simple and inexpensive cooling air delivery system is provided for establishing a predetermined flow rate of cooling air. The fluid flow control passage has a preselected fixed diameter. The elongate member includes a stem which has an outer diameter smaller than the preselected fixed diameter of the fluid flow control passage. The stem is positioned within the diameter of the fluid flow control passage establishing a flow rate of cooling air between the stem and passage diameter in accordance with predetermined operating parameters of the engine. The flow rate is changeable by replacing the elongate member and stem with another elongate member and stem having a different outer diameter In another embodiment of the present invention, a simple and inexpensive cooling air delivery system is provided for establishing a predetermined flow rate of cooling air. The fluid flow control passage has a preselected fixed diameter. The elongate member includes a stem and a removable sleeve. The sleeve of the elongate member is positioned within the diameter of the fluid flow control passage establishing a flow rate of cooling air between the sleeve and passage diameter in accordance with predetermined operating parameters of the engine. The flow rate is changeable by replacing the sleeve on the stem with another sleeve having a different outer diameter, when the change is needed according to measured upstream and downstream presure ratios.

In both embodiments, the elongate member being accessible external of the engine provides a simple easy method of changing the cooling air flow rate. Should the engine components become worn sufficient to require a change in the flow rate, the elongate member is easily changed without disassembly of the internal engine components.

BRIEF DESCRIPTION OF THE DRAWINGS

FIG. 1 is a sectional side view of a portion of a gas turbine engine embodying the present invention.

FIG. 2 is an enlarged sectional view of a portion of FIG. 1 embodying the present invention.

BEST MODE FOR CARRYING OUT THE INVENTION

Referring to FIG. 1, a gas turbine engine 10, not shown in its entirety, has been sectioned to show a cooling air delivery system 12 for cooling components of a turbine section 14 of the engine. The engine 10 includes an outer case 16, a combustor section 18, a compressor section 20 and a compressor discharge plenum 22 fluidly connecting the air delivery system 12 to the compressor section 20. The plenum 22 is partially defined by the outer case 16 and a multipiece inner wall 24 partially surrounding the turbine section 14 and the combustor section 18. The compressor section 20 includes a plurality of rotatable blades 26 attached to a longitudinally extending center shaft 28 driven by a gasifier turbine section 29. A plurality of compressor stator blades 30 extend from the outer case 16 and are positioned between the rotatable blades. The compressor 20 is a multistage axial compressor although only a single stage is shown. The combustor section 18 includes a combustion chamber 32 positioned in the plenum 22 and a plurality of fuel nozzles 34 (one shown) positioned in the chamber 32 at the end near the compressor section 20. The turbine section includes a first stage turbine 36 disposed partially within an integral first stage nozzle and shroud assembly 38. The assembly 38 is attached to the inner wall 24 and supported from the center shaft 28 by a bearing arrangement 40 and a series of thermally varied masses 46 which are assembled to prevent rapid thermal variation during heating and cooling of such masses 46. A nozzle support case 48 is disposed within the outer case 16 and attaches to the case 16 by a plurality of bolts and dowels not shown. An integral second stage nozzle and shroud assembly 50 is attached to the nozzle support case 48 by a plurality of nozzle hooks 52 and a second stage turbine 54 is disposed partially within the assembly 50. An integral third stage nozzle and shroud assembly 56 is attached to the nozzle support case 48 by a plurality of nozzle hooks 58 and a third stage turbine 62 is disposed partially within the assembly 56. All the turbines 36,54,62 are connected to the longitudinally extending center shaft 28.

As more clearly shown in FIG. 2, the cooling air delivery system has a fluid flow path 64 interconnecting the compressor discharge plenum 22 with the turbine section 14. A first annular portion 66 of the fluid flow path 64 is disposed between the integral first stage nozzle and shroud assembly 38 and the multipiece inner wall 24. A plurality of passages 68 in the inner wall 24 provide communication of cooling air from the compressor discharge plenum 22 to the first annular portion 66. An annular cooling passage 70 is disposed between the nozzle support case 48 and the second stage nozzle assembly 38. A plurality of orificed passages 72 and a first fluid flow control passage 74 in the nozzle support case 48 connects the annular portion 66 of the fluid flow path 64 with the annular cooling passage 70. The first fluid flow control passage 74 has a preselected fixed diameter 75. An elongate member 76 accessible external of the engine 10 has a stem 78 and extends into the first fluid flow control passage 74. The stem 78 has an outer diameter 80 smaller than the preselected fixed diameter 75 of the first fluid flow control passage 74 forming a controlled clearance or Preselected flow area 82 therebetween. The combination of the orificed passages 72 and the preselected flow area 82 provide a preselected flow rate from the first annular portion 66 to the annular cooling passage 70. A cap 84 is threadedly attached to the outer case 16 and removal of the cap 84 provides external access to the elongate member 76. A plurality of cooling passages 86 in the second stage nozzle assembly 50 connects the annular cooling passage 70 with the second stage turbine 54. Although the passages 86 are shown as straight passages, the nozzle assembly could be hollow and include a plurality of baffles. A second annular portion 88 of the fluid flow path 64 is disposed between the multipiece inner wall 24 and the nozzle support case 48. A plurality of passages 90 (one shown) in the inner wall 24 provide communication of cooling air from the compressor discharge plenum 22 to the second annular portion 88. A plurality of second fluid flow control passages 92 are located in the nozzle support case 48 and connects the second annular portion 88 of the fluid flow path 64 with a second annular cooling passage 94 disposed between the nozzle support case 48 and the third stage nozzle assembly 56. The second fluid flow control passages 92 have a preselected fixed diameter 96. A plurality of elongate members, one shown at 76, accessible external of the engine extend into each of the second fluid flow control passages 92. The stem 78 of each member 76 has a sleeve 98 removably attached thereto. The sleeve 98 has an outer diameter 100 smaller than the preselected fixed diameter 96 of the second control passage 92 and the difference between the diameters 96, 100 establishes the controlled clearance or preselected flow area. The combination of the plurality of flow areas established by the clearance between each sleeve 98 and each second control passage 92 provide the preselected flow rate from the second annular portion 88 to the second annular cooling passage 94. The elongate member 76 is secured to the external portion of the engine 10 by a threaded portion 112 on the stem 78. A hex head 114 of the stem 76 extends external of the outer case 16 and is in sealed relationship thereto. A plurality of cooling passages 116 in the third stage nozzle assembly 56 connects the second annular cooling passage 94 with the third stage turbine 62. Although the passages 116 are shown as straight passages, the nozzle assembly could be hollow and include a plurality of baffles.

Industrial Applicability

The cooling air delivery system 12 of the present invention is a part of a gas turbine engine 10. The compressor section 20 provides combustion air and cooling air. The more cooling air that is bled from the compressor 20 the less air that is left for mixing with fuel for combustion and the lower the engine performance.

The air exits from the compressor section 20 into the compressor discharge plenum 22 and enters into the fluid flow path 64 for cooling purposes. The cooling air enters into the annular portion 66 through a plurality of passages 68 in the multipiece inner wall 24 and cools the first stage nozzle assembly 38. Cooling air enters an annular cooling passage 70 through a plurality of orificed passages 72 in the nozzle support case 48 and through the clearance 82 between the stem 78 and the first fluid control passage 74. From the annular cooling passage 70, air passes through the second stage nozzle assembly 50 cooling the second stage turbine rotor 54. The preselected flow area 82 between the outer diameter 80 of the stem 78 on the elongate member 76 and the preselected fixed diameter 75 of the first fluid flow control passage 74 controls the flow of cooling air to the second stage turbine rotor 54.

As the gas turbine engine 10 wears, more cooling air is required to compensate for leakage associated with the wear. The elongate member 76, which in this case is the existing borescope plug assembly 76, used to seal the borescope hole within the second-stage turbine 54, is accessible from external of the engine 10. During the early period of engine 10 operation, first or second year, when the cooling air delivery system 12 leakage is small, the engine performance can be optimized by reducing the preselected flow area 82 between the stem 78 and the first fluid control passage 74. After an extended period of engine operation when cooling air delivery system leakage increases, cooling flow needs to be compensated by increasing the preselected flow area 82 between the stem 78 and the first fluid control passage 74. The cap 84 is removed from the outer case 16 and the borescope plug assembly is removed from the first fluid control passage 74. A different borescope plug assembly 76 is assembled in the engine 10 to increase the clearance or preselected flow area 82 between the stem 78 and the fluid control passage 74. The stem 78 on the new borescope plug is slightly smaller than the first borescope plug assembly 76 and in turn increases the clearance or preselected flow area 82 between the stem 78 and the first fluid control passage 74. The increased clearance increases the amount of cooling air entering the annular cooling passage 70 enabling engine optimization.

The cooling air enters the second annular portion 88 through the plurality of passages 90 and enters the second annular cooling passage through the preselected flow area 82 between the plurality of second fluid control passages 92 and the plurality of sleeves 98 on the elongate members 76 can also be changed to control the clearance 82, regulating the amount of cooling air being bled from the compressor section 20. The elongate member 76 in this case is the plurality of thermocouple probes 76 used to monitor inlet temperature in the third stage power turbine 62. The sleeves 98 are removably attached to the stem 78 of the thermocouples 76 which are accessible external of the engine 10. During the early period of engine 10 operation, first or second year, when the cooling air delivery system 12 leakage is small, the engine performance can be optimized by reducing the preselected flow area 82 between the sleeve 96 and the second fluid control passage 92. After an extended period of engine operation when cooling air delivery system leakage increases the cooling flow can be optimized by increasing the preselected flow area 82 between the sleeve 96 and the second fluid control passage 92. The thermocouples 76 are removed from the engine 10. The sleeves 98 are removed from the stem 78 and another sleeve 98 having a slightly smaller outside diameter 100 is placed on the stem 78. The thermocouple probes 76 and sleeves 98 are repositioned in the engine 10 and increase the preselected flow area 82 between the second fluid control passage 92 and the new slightly smaller sleeve 96. The increased clearance 82 in turn increases the flow of cooling air into the second annular cooling passage 94 for rotor rim cooling through the third stage nozzle assembly 56 providing the adequate engine life.

The same process of changing the preselected flow area 82 between the stem 78 or sleeve 96 and the fluid control passages 74,92 can be used to fine tune a new or reconditioned gas turbine engine 10.

The primary advantage of the changeable cooling control system 12 is the ability to upgrade or fine tune the gas turbine engine 10 without major disassembly and down time. The simple process of removing the borescope plug assembly 76 and/or the thermocouples 76 and sleeves 96 which are accessible external of the engine 10 and replacing the borescope plug assembly 76 and sleeve 96 with another larger or smaller sized assembly 76 or sleeve 96 to change the clearance is very cost effective. The optimized power output prolongs engine durability and reduces maintenance costs.

Other aspects, objects and advantages of this invention can be obtained from a study of the drawings, the disclosure and the appended claims.

We claim:

1. A cooling air delivery system for cooling components of a gas turbine engine having a compressor section and a compressor discharge plenum fluidly connecting the air delivery system to the compressor section comprising:

a fluid flow path interconnecting the compressor discharge plenum with the engine components to be cooled, said fluid flow path including a fluid flow control passage; and an elongate member extending into said passage and having an outer diameter selected to establish a flow rate of cooling air through the remainder of the passage in accordance with predetermined operating parameters of the engine, said member having a portion thereof accessible externally of the engine, wherein said fluid flow path includes an annular cooling passages, a plurality of passages communicating the annular cooling passage with the engine components to be cooled, said control passage communicating cooling air from the compressor discharge plenum to the annular cooling passage, wherein said elongate member includes a stem and a sleeve having an outer diameter and being removably attached to the stem, wherein said fluid control passage has a preselected fixed diameter and said outer diameter of the sleeve being smaller than said preselected diameter establishing a preselected flow area.

2. The cooling air delivery system of claim 1 wherein said fluid flow path includes a plurality of fluid flow control passages and said cooling air delivery system includes a plurality of elongate members.

3. The cooling air delivery system of claim 2 wherein said fluid control passage has a preselected fixed diameter and said outer diameter of the elongate member being smaller than said preselected diameter establishing a preselected flow area.

4. The cooling air delivery system of claim 1 wherein said fluid flow path further includes a plurality of orificed passages interconnecting the first annular portion with the annular cooling passage forming a combined total flow area to cool the engine components.

5. A gas turbine engine including a cooling air delivery system for cooling a nozzle vane, a turbine rotor, a compressor section and a compressor discharge plenum fluidly connecting the air delivery system to the compressor section comprising:

a fluid flow path interconnecting the compressor discharge plenum with the nozzle vane to be cooled, said fluid flow path including a fluid flow control passage; and an elongate member extending into said passage and having an outer diameter selected to establish a flow rate of cooling air through the reminder of the passage in accordance with predetermined operating parameters of the engine, said member having a portion thereof accessible external of the engine wherein said fluid flow path includes an annular cooling passage, a plurality of passages communicating the annular cooling passage with the engine components to be cooled, said control passage communicating cooling air from the compressor discharge plenum to the annular cooling passage, wherein said elongate member includes a stem a sleeve having an outer diameter and being removably attached to the stem, wherein said fluid control passage has a preselected fixed diameter and said outer diameter of the elongate member bieng smaller then said preselected diameter establishing a preselected flow area.

6. The gas turbine engine of claim 5 wherein said fluid flow path includes a plurality of fluid flow control passages and said cooling air delivery system includes a plurality of elongate members.

7. The gas turbine engine of claim 5 wherein said elongate member includes a stem having in outer diameter.

8. The gas turbine engine of claim 5 wherein said fluid flow path further includes a plurality of orificed passages interconnecting the first annular portion with the annular cooling passage forming a combined total flow area to cool the nozzle vane and the turbine rotor.

9. A method of optimizating a flow rate of a cooling air delivery system for cooling components of a gas turbine engine, said cooling air delivery system having a fluid flow control passage and an elongate member extending into said passage to establish a flow rate of cooling air through the remainder of the passage, the improvement comprising the steps of:

removing the elongate member from said flow control passage;

measuring an outer diameter of the elongate member; determining the desire flow rate required; and installing into said flow control passage an elongate member having one of a smaller outer diameter and a larger outer diameter.

10. A method of optimizating a flow rate of a cooling air delivery system for cooling components of a gas turbine engine, said cooling air delivery system having a fluid flow control passage and an elongate member having a stem and a sleeve being removably attached to the stem, said elongate member and said sleeve extending into said passage to establish a flow rate of cooling air through the remainder of the Passage, the improvement comprising the steps of:

removing said elongate member from said fluid flow control passage;

determining the desired flow rate required;

removing said sleeve from said stem;

attaching to the stem a new sleeve having one of a smaller outer diameter and a larger outer diameter; and reinstalling into said fluid flow control passage the elongate member having the new sleeve.

* * * * *